(12) United States Patent
Li et al.

(10) Patent No.: US 10,288,135 B2
(45) Date of Patent: May 14, 2019

(54) BRAKE FOR ELEVATOR AND A REPLACEMENT METHOD OF DAMPER OF THE BRAKE FOR ELEVATOR

(71) Applicant: Otis Elevator Company, Farmington, CT (US)

(72) Inventors: Yatao Li, Tianjin (CN); YaFei Ren, Tianjin (CN); GuoChen Gao, Tianjin (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 14 days.

(21) Appl. No.: 15/437,637

(22) Filed: Feb. 21, 2017

(65) Prior Publication Data

US 2017/0299003 A1 Oct. 19, 2017

(30) Foreign Application Priority Data

Feb. 22, 2016 (CN) .......................... 2016 1 0095212

(51) Int. Cl.
| | |
|---|---|
| *F16D 65/00* | (2006.01) |
| *F16D 65/095* | (2006.01) |
| *B66B 19/00* | (2006.01) |
| *B66D 5/08* | (2006.01) |
| *B66D 5/30* | (2006.01) |

(Continued)

(52) U.S. Cl.
CPC ............ *F16D 65/095* (2013.01); *B66B 19/00* (2013.01); *B66D 5/08* (2013.01); *B66D 5/30* (2013.01); *F16D 65/0006* (2013.01); *B66B 1/32* (2013.01); *F16D 2121/14* (2013.01); *F16D 2121/22* (2013.01); *F16D 2250/0084* (2013.01)

(58) Field of Classification Search
CPC ............ F16D 65/0006; F16D 2121/18; F16D 2121/20; B66D 5/08
See application file for complete search history.

(56) References Cited

U.S. PATENT DOCUMENTS

| | | | |
|---|---|---|---|
| 5,739,610 A | | 4/1998 | Nemoto et al. |
| 5,800,079 A | * | 9/1998 | Qvarth .................. B23C 5/2226 144/230 |

(Continued)

FOREIGN PATENT DOCUMENTS

| | | |
|---|---|---|
| CN | 103241674 A | 8/2013 |
| EP | 0811780 B1 | 10/2001 |

(Continued)

OTHER PUBLICATIONS

European Search Report for application 17157042.7, dated Jun. 12, 2017, 8 pages.

*Primary Examiner* — Nicholas J Lane
(74) *Attorney, Agent, or Firm* — Cantor Colburn LLP (57) ABSTRACT

The present invention provides an elevator brake and a cushion replacement method of the elevator brake, and relates to the field of elevator braking technologies. The elevator brake of the present invention includes a first block and a second block that collide with each other during braking, and a cushion located between the first block and the second block, and further includes a cushion support detachably mounted on the first block or the second block, where the cushion is disposed on the cushion support. A cushion of the elevator brake in the present invention can be replaced without disassembling the whole elevator brake.

14 Claims, 8 Drawing Sheets

(51) Int. Cl.
*B66B 1/32* (2006.01)
*F16D 121/14* (2012.01)
*F16D 121/22* (2012.01)

(56) References Cited

U.S. PATENT DOCUMENTS

| | | | |
|---|---|---|---|
| 6,321,883 | B1 | 11/2001 | Pfann et al. |
| 7,699,145 | B2 | 4/2010 | Ericson |
| 8,091,691 | B2 * | 1/2012 | Qu .......................... B66D 5/14 188/161 |
| 8,739,937 | B2 | 6/2014 | Fischer et al. |
| 8,746,411 | B2 | 6/2014 | Roberts et al. |
| 9,145,936 | B2 | 9/2015 | Olkkonen et al. |
| 2002/0066629 | A1 | 6/2002 | Muller |
| 2013/0277152 | A1 | 10/2013 | Fargo et al. |
| 2014/0048359 | A1 | 2/2014 | Olkkonen et al. |
| 2014/0339025 | A1 | 11/2014 | Kocher |
| 2015/0114762 | A1 | 4/2015 | Olkkonen et al. |
| 2015/0151949 | A1 | 6/2015 | Kocher et al. |
| 2016/0031674 | A1 * | 2/2016 | Hoshinoo ................ B66D 5/30 187/254 |
| 2016/0039637 | A1 | 2/2016 | Momoki |

FOREIGN PATENT DOCUMENTS

| | | |
|---|---|---|
| EP | 0876559 B1 | 3/2002 |
| EP | 1423626 B1 | 12/2004 |
| EP | 2480488 B1 | 4/2014 |
| EP | 1424302 B2 | 9/2015 |
| WO | 2006049612 A1 | 5/2006 |
| WO | 2015139987 A1 | 9/2015 |

* cited by examiner

A2-A2 section

FIG. 10B

C2-C2 section

D1-D1 section

F1-F1 section

FIG. 16B

BRAKE FOR ELEVATOR AND A REPLACEMENT METHOD OF DAMPER OF THE BRAKE FOR ELEVATOR

PRIORITY

This application claims priority to Chinese Patent Application No. 201610095212.1, filed 22 Feb. 2016, and all the benefits accruing therefrom under 35 U.S.C. § 119, the contents of which in its entirety are herein incorporated by reference.

TECHNICAL FIELD

The present invention belongs to the field of elevator braking technologies, relates to an elevator brake, and in particular, to an elevator brake using a detachably mounted cushion support and a method for replacing a cushion of the elevator brake.

BACKGROUND ART

An elevator brake is one of the important safety devices of an elevator system, and its safety and reliability is an important guarantee for safe running of an elevator.

A regular elevator brake mainly includes a static plate and a movable plate. During a braking operation of an elevator, the movable plate may move with respect to the static plate, thus generating a collision with each other. In order to mitigate problems such as noise caused by such a collision, several cushions may be disposed between the static plate and the movable plate.

The patent, with Patent Application No. PCT/US2004/036182, discloses a basic working principle of an existing brake.

Currently, all existing elevator brakes need a maintenance operation after being used for a long time. For example, after use for a long time, cushions will become worn and fatigue, and the function of the cushions will be reduced, causing problems such as an increase in noise. Therefore, it is necessary to replace cushions. Cushion replacement is one of the important jobs for maintenance of the elevator brake.

Because the cushions are mounted between the static plate and the movable plate, the replacement and mounting work becomes extremely difficult. In all the existing elevator brakes, cushion replacement is carried out by disassembling the whole elevator brake. On one hand, such a manner is extremely time-consuming, is heavy in workload, and is high in replacement costs; on the other hand, after the whole elevator brake is disassembled and then mounted again, running reliability thereof may be hard to recover, which may cause safety risks. Furthermore, such a manner requires operating personnel to have a high degree of specialization.

SUMMARY OF THE INVENTION

An objective of the present invention is to make it easy to replace a cushion of an elevator brake without disassembling the whole elevator brake.

In order to achieve the above or other objectives, the present invention provides the following technical solutions.

According to an aspect of the present invention, an elevator brake is provided, including a first block and a second block that collide with each other during braking, and a cushion located between the first block and the second block, and further including a cushion support detachably mounted on the first block or the second block, the cushion being disposed on the cushion support.

In the elevator brake according to an embodiment of the present invention, the cushion support includes a cushion receiving portion and a fixed mounting portion, the fixed mounting portion is perpendicularly bent with respect to the cushion receiving portion, the cushion receiving portion is disposed between the first block and the second block, and the fixed mounting portion is disposed in an exposed manner on an exposed surface of the first block or the second block.

The cushion receiving portion is provided with one or more receiving holes for mounting the cushion.

The cushion is an O ring or a cylinder, and an aperture of the receiving hole is set to be smaller than a diameter of the cushion such that the cushion is firmly mountable on the cushion support.

Optionally, the receiving hole is of a stepped hole structure penetrating through the fixed mounting portion, or a recessed hole structure not penetrating through the fixed mounting portion.

Specifically, the fixed mounting portion is provided with a threaded hole, and a screw penetrates through the threaded hole to detachably fasten the cushion support on the first block or the second block.

In the elevator brake according to another embodiment of the present invention, corresponding to that the cushion support is detachably mounted on the first block, the first block is a static plate.

In the elevator brake according to an embodiment of the present invention, the static plate is provided with a groove, and the groove is used for receiving and fixing the cushion support.

Specifically, the groove includes a first part of groove disposed on a collision surface of the static plate and a second part of groove disposed on an exposed surface of the static plate; where the collision surface of the static plate faces the second block, and the exposed surface is perpendicular to the collision surface; the first part of groove is used for receiving the cushion receiving portion of the cushion support, and the second part of groove is used for receiving and fixing the fixed mounting portion of the cushion support.

In an optional solution, the static plate is of a cuboid structure, and the groove is disposed at a central position in a length direction of the cuboid-structure static plate.

In another optional solution, the static plate is of a cuboid structure, and the groove is disposed at a central position in a width direction of the cuboid-structure static plate.

In the elevator brake according to a yet another embodiment of the present invention, corresponding to that the cushion support is detachably mounted on the second block, the second block is a movable plate.

In the elevator brake according to a yet another embodiment of the present invention, the movable plate is at least provided with a first groove, and the first groove is used for receiving and fixing the fixed mounting portion of the cushion support; the first groove is disposed on an exposed surface of the movable plate, where the movable plate has a collision surface facing the first block, and the exposed surface of the movable plate is perpendicular to the collision surface.

Further, a collision surface of the first block is provided with a second groove, and the second groove is used for receiving the cushion receiving portion of the cushion support; where the collision surface of the first block faces the second block.

Further, the movable plate and the first block are of a cuboid structure, the first groove is disposed at a central position in a length/width direction of the cuboid-structure movable plate, and the second groove is disposed at a central position in a length/width direction of the cuboid-structure first block, and is aligned with the first groove.

In the elevator brake in any of the foregoing embodiments, the first block is a static plate, the second block is a movable plate, the elevator brake is further provided with a guiding component, and the guiding component is used for limiting a movement direction of the movable plate with respect to the static plate.

Further, the elevator brake is provided with a brake lining and an intermediate block, the brake lining and the intermediate block are disposed on a same side as the movable plate and synchronously move with the movable plate.

In the elevator brake according to any of the foregoing embodiments, the elevator brake is further provided with a release component.

In the elevator brake according to any of the foregoing embodiments, two or more cushion supports are provided.

According to another aspect of the present invention, a cushion replacement method of any of the foregoing elevator brakes is provided, including steps of:

detaching the cushion support from the elevator brake without detaching at least the first block or second block of the elevator brake;

replacing the cushion mounted on the cushion support; and mounting and fixing the cushion support back to the elevator brake.

In the cushion replacement method according to an embodiment of the present invention, the step of detaching the cushion support is performed in the case that the elevator brake is not powered on, and in this case, the first block and the second block are disengaged.

According to a yet another aspect of the present invention, an elevator system is provided, the elevator system using any of the foregoing elevator brakes.

The technical effect of the present invention is that, by setting a detachably mounted cushion support, an operation of replacing a cushion of the elevator brake of the present invention is simple and time-saving, has a low requirement on operating personnel, and significantly reduces maintenance costs of the elevator brake; especially, it is unnecessary to disassemble the whole elevator brake, and the cushion replacement operation would not affect the running reliability of the elevator brake.

BRIEF DESCRIPTION OF THE DRAWINGS

The foregoing and other objectives and advantages of the present invention will become more complete and clearer in the following detailed description with reference to the accompanying drawings, where identical or similar elements are represented by using identical reference numerals.

FIGS. 5A-5D are three-dimensional schematic structural diagrams of a cushion support of the elevator brake according to the first embodiment of the present invention, where FIG. 5C is a three-dimensional schematic structural diagram of a cushion support 130a, and FIG. 5D is a schematic structural diagram of a C1-C1 section of the cushion support 130a;

FIGS. 10A-10D are three-dimensional schematic structural diagrams of a cushion support of the elevator brake according to the second embodiment of the present invention, where FIG. 10C is a three-dimensional schematic structural diagram of a cushion support 230a, and FIG. 10D is a schematic structural diagram of a C2-C2 section of the cushion support 230a;

FIGS. 15A-B are a three-dimensional schematic structural diagrams of a cushion support of the elevator brake according to the third embodiment of the present invention, where FIG. 15A is a three-dimensional schematic structural diagram of a cushion support 330, FIGS. 16A-B are three-dimensional schematic structural diagrams of another alternative embodiment of a cushion support used in the cushion support of the elevator brake according to the third embodiment, where FIG. 16A is a three-dimensional schematic structural diagram of a cushion support 330.

DETAILED DESCRIPTION

Some of multiple possible embodiments of the present invention are described below, which are intended to provide a basic understanding of the present invention, but are not intended to confirm the key or decisive elements of the present invention or limit the scope to be protected. It is easy to understand that, according to the technical solutions of the present invention, persons skilled in the art may propose other alternative implementations without changing the substantial spirit of the present invention. Therefore, the specific implementations below and the accompanying drawings are merely illustrative descriptions of the technical solutions of the present invention, and should not be construed as whole content of the present invention or a limitation or restriction to the technical solutions of the present invention.

In the following description, for ease of description, a length direction of an elevator brake is defined as an x-direction, a width direction of the elevator brake is defined as a y-direction, and a direction perpendicular to a collision surface of the elevator brake is defined as a z-direction. It should be understood that, the definitions of these directions are used for relative descriptions and clarification, and may change correspondingly as the direction of the elevator brake changes.

Embodiment I

An elevator brake 10 according to this embodiment of the present invention is illustrated in detail below with reference to FIG. 1 to FIGS. 5A-5D.

In this embodiment, the elevator brake 10 may be used for braking an elevator during normal running of the elevator, for example, the elevator brake 10 brakes the elevator by acting on a traction motor of an elevator system, and may specifically brake the elevator by acting on a brake pulley of a rotor of the traction motor. The elevator brake 10 in this embodiment of the present invention mainly includes a first block and a second block that are disposed opposite to each other, the first block is specifically a static plate 110 of a plate-like structure, and the second block is specifically a movable plate 120 of a plate-like structure; in other embodiments, it is also possible that the second block is specifically a static plate 110 of a plate-like structure, and the first block is specifically a movable plate 120 of a plate-like structure; specific structures of the first block and the second block are not limited to the cuboid plate-like structure in this embodiment of the present invention.

The elevator brake 10 may be an electromagnetic brake; specifically, an electromagnetic coil may be disposed in the static plate 110, and the movable plate 120 may be provided with an electromagnetic core, or even the whole movable plate 120 may be made of a magnetic conductive material, thus becoming an electromagnetic core as a whole. In this way, when the electromagnetic coil of the static plate 110 is electrified, the movable plate 120 may be magnetized quickly, so that the static plate 110 and the movable plate 120 are quickly engaged due to an electromagnetic force and collide with each other. A brake spring (not shown in the figure) may be disposed between the static plate 110 and the movable plate 120, and when the electromagnetic coil is not electrified, a resilience of the brake spring enables the movable plate 120 to move towards a direction opposite to the z-direction, thus braking the brake pulley of the traction motor, to brake or immobilize the elevator. When the elevator system runs, the electromagnetic coil of the static plate 110 is electrified to engage the static plate 110 and the movable plate 120, thus stopping braking the brake pulley of the traction motor.

Figure 2:
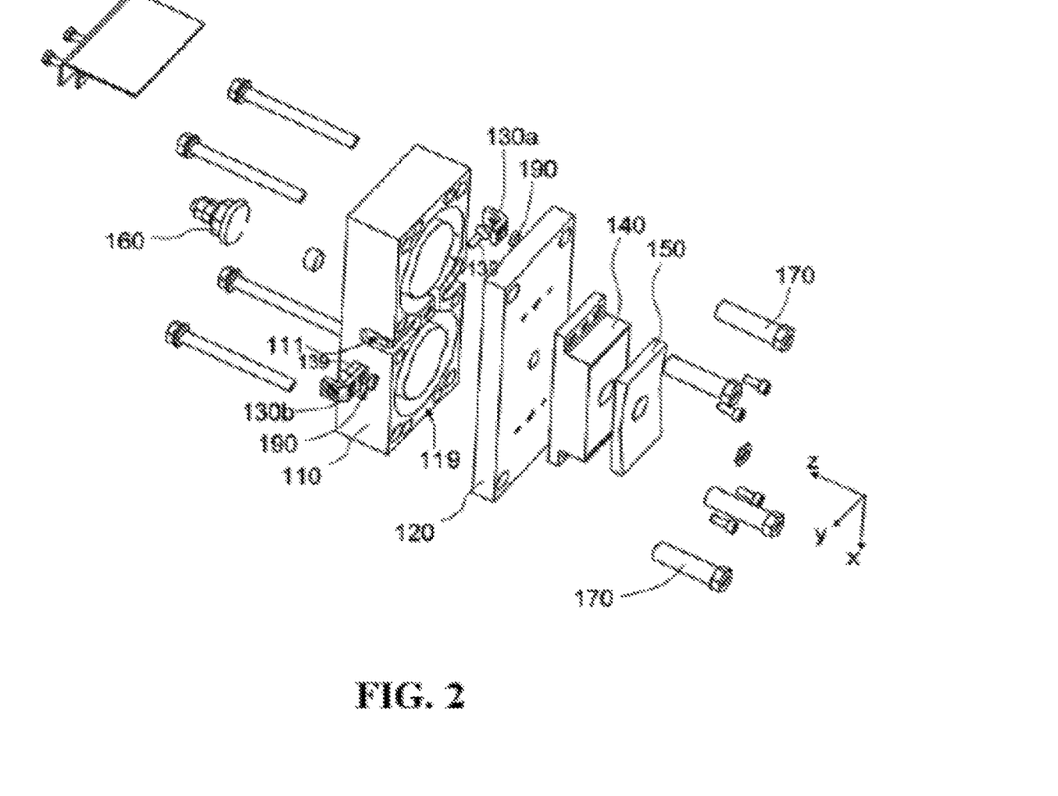
FIG. 2 is an exploded view of the elevator brake according to the first embodiment of the present invention.
Figure 3:
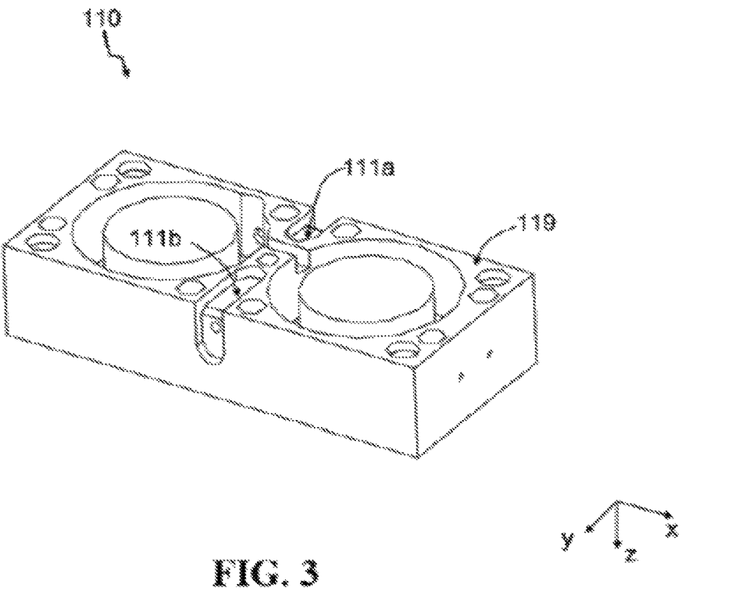
FIG. 3 is a three-dimensional schematic structural diagram of a static plate of the elevator brake according to the first embodiment of the present invention.
Figure 4:
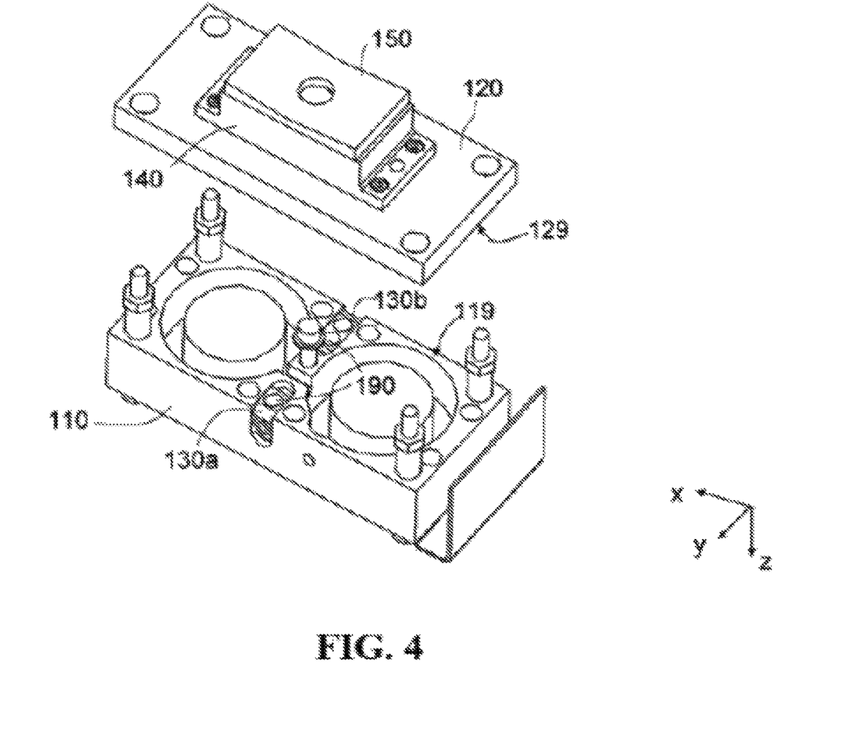
FIG. 4 is a three-dimensional schematic structural diagram of a static plate and a movable plate of the elevator brake according to the first embodiment of the present invention.
Figure 5A:
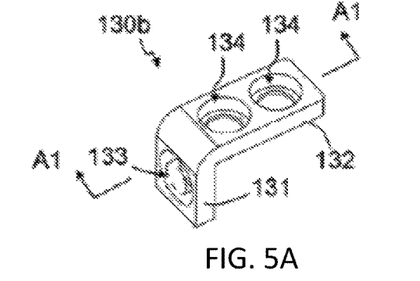
FIG. 5A is a three-dimensional schematic structural diagram of a cushion support 130b.
Figure 5B:
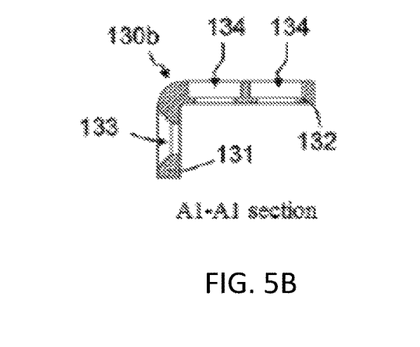
FIG. 5B is a schematic structural diagram of an A1-A1 section of the cushion support 130b.
Figure 5C:
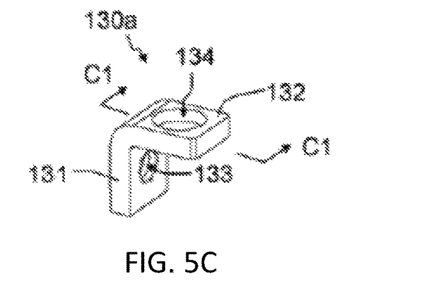
Figure 5D:
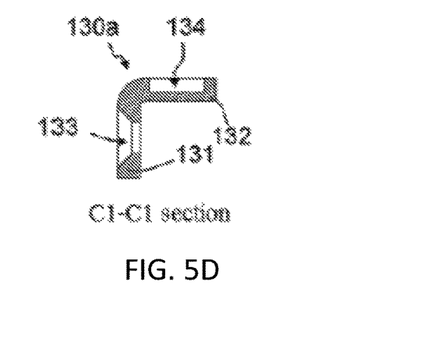

As shown in FIG. 2 to FIG. 4, interaction surfaces between the static plate 110 and the movable plate 120 are a collision surface 119 of the static plate 110 and a collision surface 129 of the movable plate 120 respectively; the collision surface 119 is a surface, which faces the movable plate 120, of the static plate 110, and the collision surface 129 is a surface, which faces the static plate 110, of the movable plate 120. In order to avoid adverse effects such as noise between the static plate 110 and the movable plate 120 during collision, a cushion 190 as shown in FIG. 2 needs to be disposed between the static plate 110 and the movable plate 120; the cushion 190 may be made of various materials having an elastic cushioning function, a specific material type selected for the cushion 190 is not limited, and the shape of the cushion 190 is not limited to the O ring in the embodiment shown in the figure, and may also be, for example, a cylinder.

A cushion support 130 (i.e., 130a and 130b) is specifically disposed for the cushion 190 of the elevator brake 10 in this embodiment of the present invention. The cushion support 130 may be used for disposing the cushion 190, and is specifically provided with a receiving hole 134. The shape of the receiving hole 134 may be designed corresponding to the shape of the cushion 190, for example, the diameter of the receiving hole 134 is set corresponding to the diameter of the cushion 190 which is an O ring or a cylinder; to prevent the cushion 190 from falling during replacement, the diameter of the circular receiving hole 134 is set to be slightly smaller than the aperture of the cushion 190, for example, 1-2 mm smaller than the aperture of the cushion 190, so that the cushion 190 is firmly mountable on the cushion support 130 and would not fall.

In this embodiment, the cushion support 130 of the elevator brake 10 is designed as a separate part, that is, the cushion support 130 is detachably mounted on the static plate 110; specifically, as shown in FIGS. 5A-5D, the cushion supports 130b and 130a are each provided with a threaded hole 133, and can be fixedly mounted on the static plate 110 by using a screw 139 as shown in FIG. 2, and the screw 139 may be detached, thus detaching the cushion support 130.

In this embodiment, there are two cushion supports 130, that is, the cushion supports 130a and 130b, which are oppositely disposed on the collision surface 119 of the static plate 110 along the y-direction; considering that two brake springs need to be disposed between the static plate 110 and the movable plate 120, optionally, the cushion supports 130a and 130b may be disposed, between the two brake springs, on the collision surface 119 of the static plate 110, for example, a middle position along the x-direction on the static plate 110. The cushion supports 130a and 130b in this embodiment each include a cushion receiving portion 132 and a fixed mounting portion 131, the cushion receiving portion 132 is provided with one, two, or more receiving holes 134 as described in the foregoing embodiment, and the fixed mounting portion 131 is provided with a threaded hole 133 as described in the foregoing embodiment; moreover, the fixed mounting portion 131 is perpendicularly bent with respect to the cushion receiving portion 132. The receiving hole 134 may be set to be a recessed hole structure as shown in the cushion support 130a, and does not penetrate through the fixed mounting portion 131, or may be set to be a stepped hole structure as shown in the cushion support 130b, and penetrates through the fixed mounting portion 131.

Correspondingly, groove structures as shown in FIG. 3, such as a groove 111b and a groove 111a, are disposed on an edge position of the static plate 110; in this embodiment, the static plate 110 is of a cuboid structure, and the groove 111b and the groove 111a are disposed at a central position of a length direction (x-direction) of the cuboid-structure static plate. The groove 111*a* is used for receiving and fixing the cushion support 130*a*, and the groove 111*b* is used for receiving and fixing the cushion support 130*b*; the shape of the groove 111*a* is designed corresponding to the cushion support 130*a*, and the shape of the groove 111*b* is designed corresponding to the cushion support 130*b*. In this embodiment, the groove 111*b* and the groove 111*a* each include a first part of groove disposed on the collision surface 119 of the static plate 110 and a second part of groove disposed on an exposed surface of the static plate 110, where the first part of groove correspondingly receives the cushion receiving portion 132 of the cushion support 130, and the second part correspondingly receives the fixed mounting portion 131 of the cushion support 130. In this way, the cushion 190 disposed on the cushion receiving portion 132 acts on the collision surface 129 of the movable plate 120, and moreover, the fixed mounting portion 131 is disposed in an exposed manner on the exposed surface of the static plate 110, making it very convenient to detach or mount the cushion support 130; it is unnecessary to detach the whole including the static plate 110 and the movable plate 120, and therefore, the reliability of the elevator brake 10 would not be affected, and the operation is simple and time-saving. FIG. 4 is a schematic diagram in which the cushion support 130*a* and the cushion support 130*b* are fixedly mounted on the static plate 110, and as can be seen, the fixed mounting portions 131 thereof are oppositely exposed.

Further, as shown in FIG. 1 to FIGS. 5A-5D, the elevator brake 10 is further provided with a guiding component 170, which is fixed on the static plate 110 in the z-direction, and during the braking operation, a movement direction of the movable plate 120 with respect to the static plate 110 may be limited by using the guiding component 170, for example, the movement direction is limited to be the z-direction. The guiding component 170 may specifically be, but is not limited to, a guide sleeve.

Further, as shown in FIG. 1 to FIGS. 5A-5D, the elevator brake 10 is further provided with a brake lining 150; the brake lining 150 is disposed on a same side as the movable plate 120, and may synchronously move with the movable plate 120. During braking, the brake lining 150 may directly act on the brake pulley of the traction motor. Further, an intermediate block 140 is further disposed between the brake lining 150 and the movable plate 120, the brake lining 150 is fixed on the intermediate block 140, and the intermediate block 140 may be fixed on the movable plate 120 and synchronously move with the movable plate 120. The intermediate block 140 may be, for example, an aluminum block.

Further, as shown in FIG. 1 to FIGS. 5A-5D, the elevator brake 10 is further provided with a release component 160, and by using the release component 160, the elevator brake 10 may be released manually.

Figure 1:
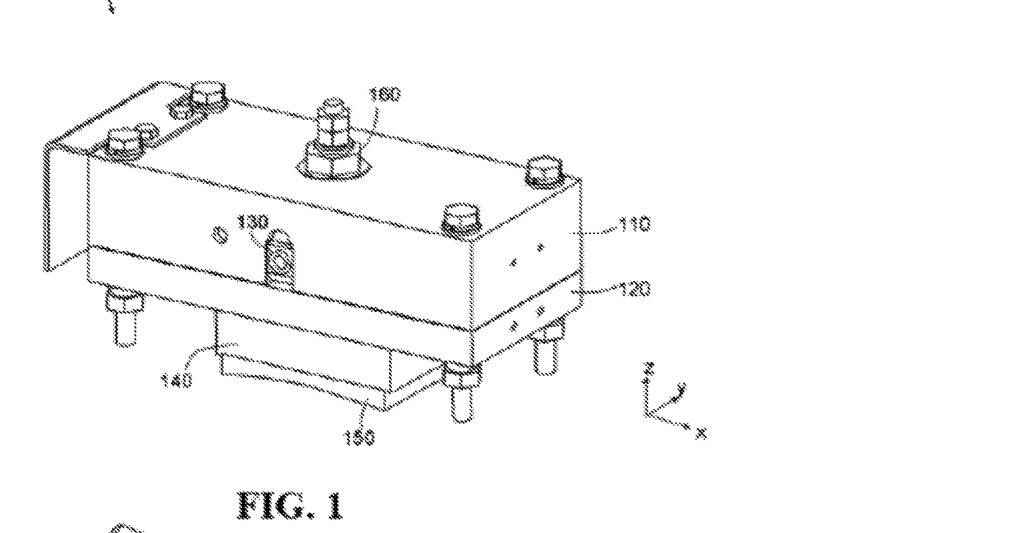
FIG. 1 is a three-dimensional schematic structural diagram of an elevator brake according to a first embodiment of the present invention.

When the cushion 190 of the elevator brake 10 in the embodiment shown in FIG. 1 needs replacement and maintenance, the coil of the static plate 110 is not electrified, and the movable plate 120 and the static plate 110 are in a normally open state (that is, a non-engaged state); the cushion support 130 is detached from the static plate 110 by loosening the screw 139, and the new cushion 190, as a replacement, is mounted to the cushion support 130; then, the cushion support 130 is placed in the groove 111 of the static plate 110, and the screw 139 is fastened. The whole process is simple and time-saving, and has a low specialized operation requirement on the staff; especially, it is unnecessary to disassemble the whole elevator brake 10, and the cushion replacement operation would not affect the running reliability of the elevator brake 10.

Embodiment II

An elevator brake 20 according to this embodiment of the present invention is illustrated in detail below with reference to FIG. 6 to FIGS. 10A-10D.

In this embodiment, the elevator brake 20 may be used for braking an elevator during normal running of the elevator, for example, the elevator brake 20 brakes the elevator by acting on a traction motor of an elevator system, and may specifically brake the elevator by acting on a brake pulley of a rotor of the traction motor. The elevator brake 20 in this embodiment of the present invention mainly includes a first block and a second block that are disposed opposite to each other, the first block is specifically a static plate 210 of a plate-like structure, and the second block is specifically a movable plate 220 of a plate-like structure; in other embodiments, it is also possible that the second block is specifically a static plate 210 of a plate-like structure, and the first block is specifically a movable plate 220 of a plate-like structure; specific structures of the first block and the second block are not limited to the cuboid plate-like structure in this embodiment of the present invention.

The elevator brake 20 may be an electromagnetic brake; specifically, an electromagnetic coil may be disposed in the static plate 210, and the movable plate 220 may be provided with an electromagnetic core, or even the whole movable plate 220 may be made of a magnetic conductive material, thus becoming an electromagnetic core as a whole. In this way, when the electromagnetic coil of the static plate 210 is electrified, the movable plate 220 may be magnetized quickly, so that the static plate 210 and the movable plate 220 are quickly engaged due to an electromagnetic force and collide with each other. A brake spring (not shown in the figure) may be disposed between the static plate 210 and the movable plate 220, and when the electromagnetic coil is not electrified, a resilience of the brake spring enables the movable plate 220 to move towards a direction opposite to the z-direction, thus braking the brake pulley of the traction motor, to brake or immobilize the elevator. When the elevator system runs, the electromagnetic coil of the static plate 210 is electrified to engage the static plate 210 and the movable plate 220, thus stopping braking the brake pulley of the traction motor.

Figure 7:
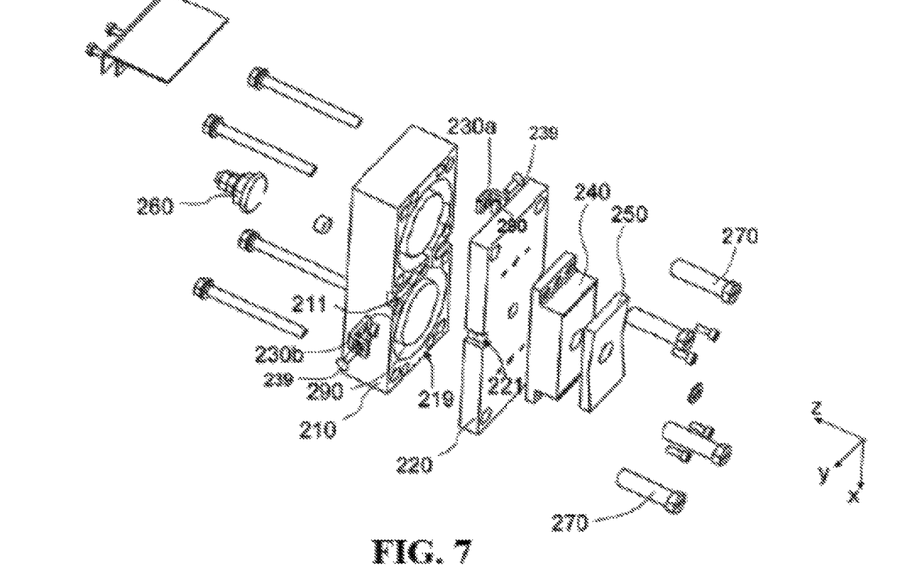
FIG. 7 is an exploded view of the elevator brake according to the second embodiment of the present invention.
Figure 8:
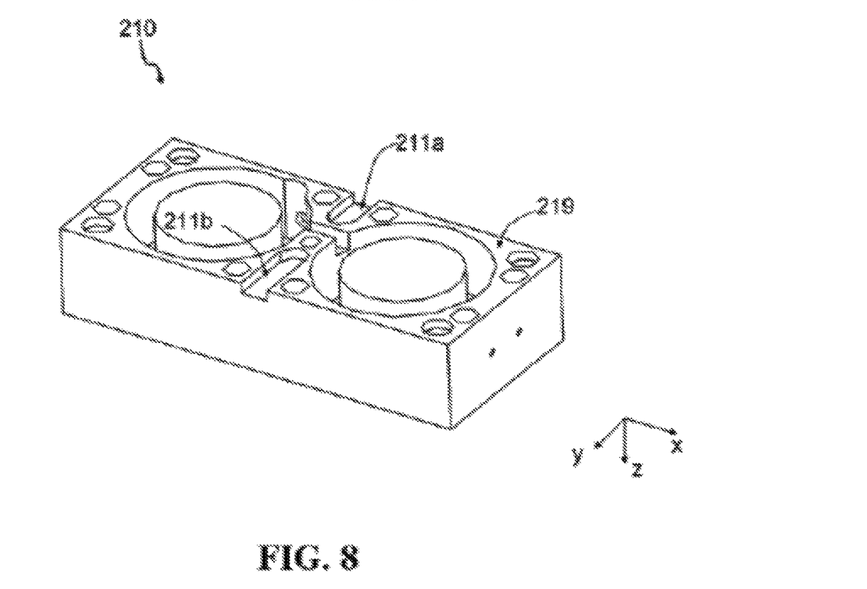
FIG. 8 is a three-dimensional schematic structural diagram of a static plate of the elevator brake according to the second embodiment of the present invention.
Figure 9:
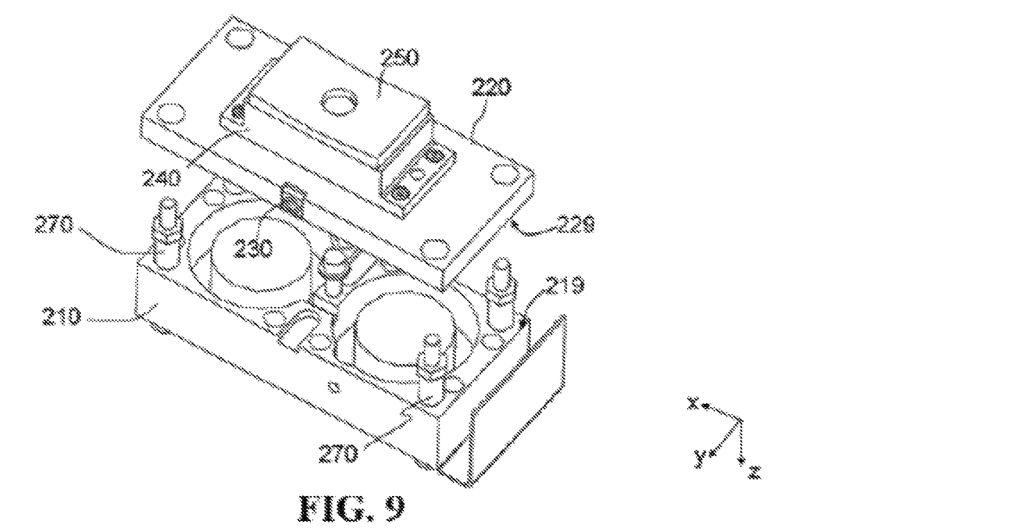
FIG. 9 is a three-dimensional schematic structural diagram of a static plate and a movable plate of the elevator brake according to the second embodiment of the present invention.
Figure 10A:
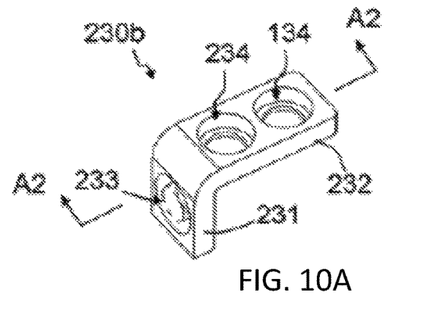
FIG. 10A is a three-dimensional schematic structural diagram of a cushion support 230b.
Figure 10B:
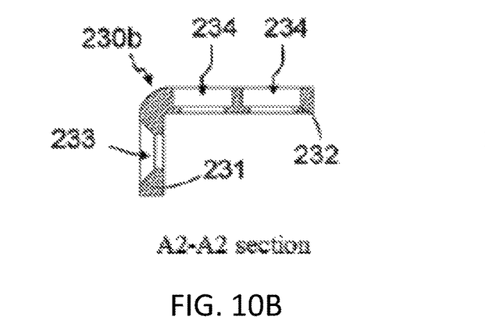
FIG. 10B is a schematic structural diagram of an A2-A2 section of the cushion support 230b.
Figure 10C:
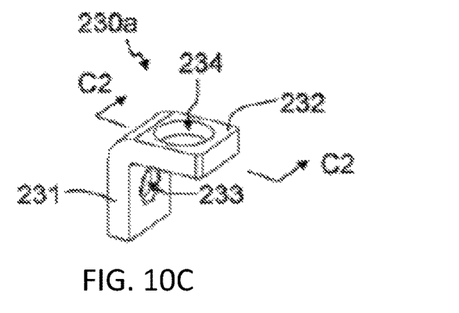
Figure 10D:
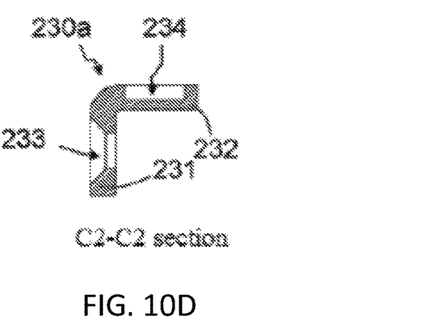

As shown in FIG. 7 to FIG. 9, interaction surfaces between the static plate 210 and the movable plate 220 are a collision surface 219 of the static plate 210 and a collision surface 229 of the movable plate 220 respectively; the collision surface 229 is a surface, which faces the movable plate 220, of the static plate 210, and the collision surface 229 is a surface, which faces the static plate 210, of the movable plate 220. In order to avoid adverse effects such as noise between the static plate 210 and the movable plate 220 during collision, a cushion 290 as shown in FIG. 7 needs to be disposed between the static plate 210 and the movable plate 220; the cushion 290 may be made of various materials having an elastic cushioning function, a specific material type selected for the cushion 290 is not limited, and the shape of the cushion 290 is not limited to the O ring in the embodiment shown in the figure, and may also be, for example, a cylinder.

A cushion support 230 (i.e., 230*a* and 230*b*) is specifically disposed for the cushion 290 of the elevator brake 20 in this embodiment of the present invention. The cushion support 230 may be used for disposing the cushion 290, and is specifically provided with a receiving hole 234. The shape of the receiving hole 234 may be designed corresponding to the shape of the cushion 290, for example, the diameter of the receiving hole 234 is set corresponding to the diameter of the cushion 290 which is an O ring or a cylinder; to prevent the cushion 290 from falling during replacement, the diameter of the circular receiving hole 234 is set to be slightly smaller than the aperture of the cushion 290, for example, 1-2 mm smaller than the aperture of the cushion 290, so that the cushion 290 is firmly mountable on the cushion support 230 and would not fall.

In this embodiment, the cushion support 230 of the elevator brake 20 is designed as a separate part, that is, the cushion support 230 is detachably mounted on the movable plate 220; specifically, as shown in FIGS. 10A-10D, the cushion supports 230b and 230a are each provided with a threaded hole 233, and can be fixedly mounted on the static plate 210 by using a screw 239 as shown in FIG. 7, and the screw 239 may be detached, thus detaching the cushion support 230.

In this embodiment, there are two cushion supports 230, that is, the cushion supports 230a and 230b, which are oppositely disposed on the collision surface 219 of the static plate 210 along the y-direction; considering that two brake springs need to be disposed between the static plate 210 and the movable plate 220, optionally, the cushion supports 230a and 230b may be disposed, between the two brake springs, on the collision surface 219 of the static plate 210, for example, a middle position along the x-direction on the static plate 210. The cushion supports 230a and 230b in this embodiment each include a cushion receiving portion 232 and a fixed mounting portion 231, the cushion receiving portion 232 is provided with one, two, or more receiving holes 234 as described in the foregoing embodiment, and the fixed mounting portion 231 is provided with a threaded hole 233 as described in the foregoing embodiment; moreover, the fixed mounting portion 231 is perpendicularly bent with respect to the cushion receiving portion 232. The receiving hole 234 may be set to be a recessed hole structure as shown in the cushion support 230a, and does not penetrate through the fixed mounting portion 231, or may be set to be a stepped hole structure as shown in the cushion support 230b, and penetrates through the fixed mounting portion 231.

Correspondingly, groove structures as shown in FIG. 7, such as a groove 221 and a groove 211, are disposed on an edge position of the static plate 210, where the groove 221 is disposed on an exposed surface of the movable plate 220, and the groove 211 (211a and 211b) is disposed on the collision surface 229 of the static plate 210; the groove 221 and the groove 211 are jointly used for receiving the cushion support 230a or 230b. The groove 221 correspondingly receives and fixes the fixed mounting portion 231 of the cushion support 230, and may be provided with a threaded fixing hole aligned with the threaded hole 233 of the fixed mounting portion 231, so that the cushion support 230 can be fixed on the movable plate 220 by using the screw 239; the groove 211 correspondingly receives the cushion receiving portion 232 of the cushion support 230, and the cushion 290 on the cushion receiving portion 232 may act on the groove 211, thereby generating a cushioning effect on the engagement between the movable plate 220 and the static plate 210. In this way, the cushion 290 disposed on the cushion receiving portion 232 acts on the static plate 210, and moreover, the fixed mounting portion 231 is disposed in an exposed manner on the exposed surface of the movable plate 220, making it very convenient to detach or mount the cushion support 230; it is unnecessary to detach the whole including the static plate 210 and the movable plate 220, and therefore, the reliability of the elevator brake 20 would not be affected, and the operation is simple and time-saving. FIG. 9 is a schematic diagram in which the cushion support 230a and the cushion support 230b are fixedly mounted on the movable plate 220, and as can be seen, the fixed mounting portions 231 thereof are oppositely exposed.

Further, in this embodiment, the movable plate 220 and the static plate 210 are both roughly of a cuboid structure, the groove 221 is disposed at a central position in a length direction (that is, the x-direction) of the cuboid-structure movable plate 220, and the groove 211 is disposed at a central position in a length direction of the cuboid-structure static plate 210 and is aligned with the groove 221; in other alternative embodiments, the groove 221 may also be disposed at a central position in a width direction (that is, the y-direction) of the cuboid-structure movable plate 220, and the groove 211 is disposed at a central position in a width direction of the cuboid-structure static plate 210 and is aligned with the groove 221.

Further, as shown in FIG. 6 to FIGS. 10A-10D, the elevator brake 20 is further provided with a guiding component 270, which is fixed on the static plate 210 in the z-direction, and during the braking operation, a movement direction of the movable plate 220 with respect to the static plate 210 may be limited by using the guiding component 270, for example, the movement direction is limited to be the z-direction. The guiding component 270 may specifically be, but is not limited to, a guide sleeve.

Further, as shown in FIG. 6 to FIGS. 10A-10D, the elevator brake 20 is further provided with a brake lining 250; the brake lining 250 is disposed on a same side as the movable plate 220, and may synchronously move with the movable plate 220. During braking, the brake lining 250 may directly act on the brake pulley of the traction motor. Further, an intermediate block 240 is further disposed between the brake lining 250 and the movable plate 220, the brake lining 250 is fixed on the intermediate block 240, and the intermediate block 240 may be fixed on the movable plate 220 and synchronously move with the movable plate 220. The intermediate block 240 may be, for example, an aluminum block.

Further, as shown in FIG. 6 to FIGS. 10A-10D, the elevator brake 20 is further provided with a release component 260, and by using the release component 260, the elevator brake 20 may be released manually.

Figure 6:
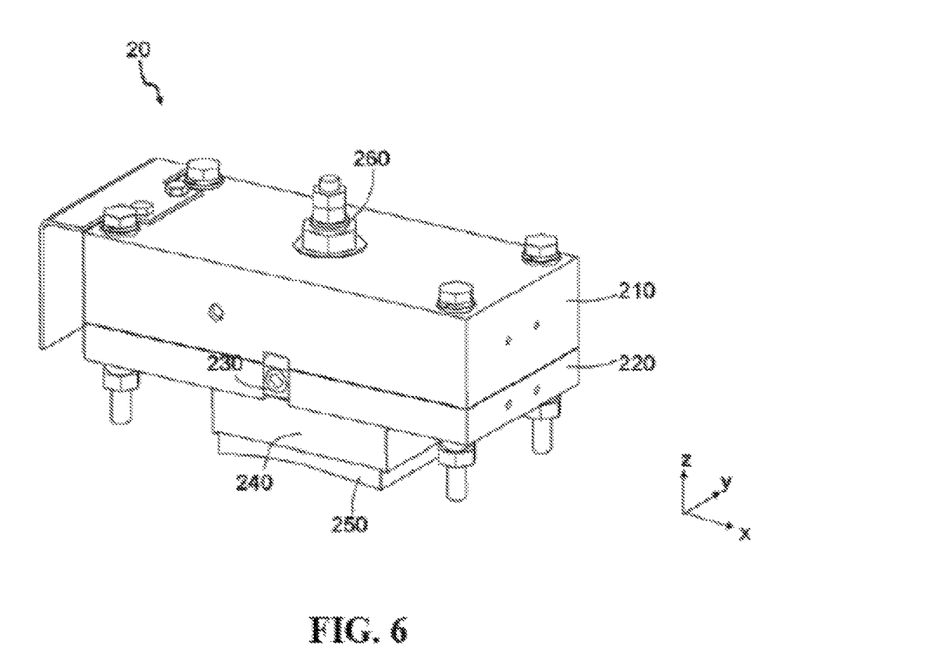
FIG. 6 is a three-dimensional schematic structural diagram of an elevator brake according to a second embodiment of the present invention.

When the cushion 290 of the elevator brake 20 in the embodiment shown in FIG. 6 needs replacement and maintenance, the coil of the static plate 210 is not electrified, and the movable plate 220 and the static plate 210 are in a normally open state (that is, a non-engaged state); the cushion support 230 is detached from the static plate 210 by loosening the screw 239, and the new cushion 290, as a replacement, is mounted to the cushion support 230; then, the cushion support 230 is placed in the groove 222 of the static plate 210, and the screw 239 is fastened. The whole process is simple and time-saving, and has a low specialized operation requirement on the staff; especially, it is unnecessary to dismount the movable plate or static plate of the elevator brake 20, and the cushion replacement operation would not affect the running reliability of the elevator brake 20.

Embodiment III

An elevator brake 30 according to this embodiment of the present invention is illustrated in detail below with reference to FIG. 11 to FIGS. 16A-16B.

In this embodiment, the elevator brake 30 may be used for braking an elevator during normal running of the elevator, for example, the elevator brake 30 brakes the elevator by acting on a traction motor of an elevator system, and may specifically brake the elevator by acting on a brake pulley of a rotor of the traction motor. The elevator brake 30 in this embodiment of the present invention mainly includes a first block and a second block that are disposed opposite to each other, the first block is specifically a static plate 310 of a plate-like structure, and the second block is specifically a movable plate 320 of a plate-like structure; in other embodiments, it is also possible that the second block is specifically a static plate 310 of a plate-like structure, and the first block is specifically a movable plate 320 of a plate-like structure; specific structures of the first block and the second block are not limited to the cuboid plate-like structure in this embodiment of the present invention.

The elevator brake 30 may be an electromagnetic brake; specifically, an electromagnetic coil may be disposed in the static plate 310, and the movable plate 320 may be provided with an electromagnetic core, or even the whole movable plate 320 may be made of a magnetic conductive material, thus becoming an electromagnetic core as a whole. In this way, when the electromagnetic coil of the static plate 310 is electrified, the movable plate 320 may be magnetized quickly, so that the static plate 310 and the movable plate 320 are quickly engaged due to an electromagnetic force and collide with each other. A brake spring (not shown in the figure) may be disposed between the static plate 310 and the movable plate 320, and when the electromagnetic coil is not electrified, a resilience of the brake spring enables the movable plate 320 to move towards a direction opposite to the z-direction, thus braking the brake pulley of the traction motor, to brake or immobilize the elevator. When the elevator system runs, the electromagnetic coil of the static plate 310 is electrified to engage the static plate 310 and the movable plate 320, thus stopping braking the brake pulley of the traction motor.

Figure 12:
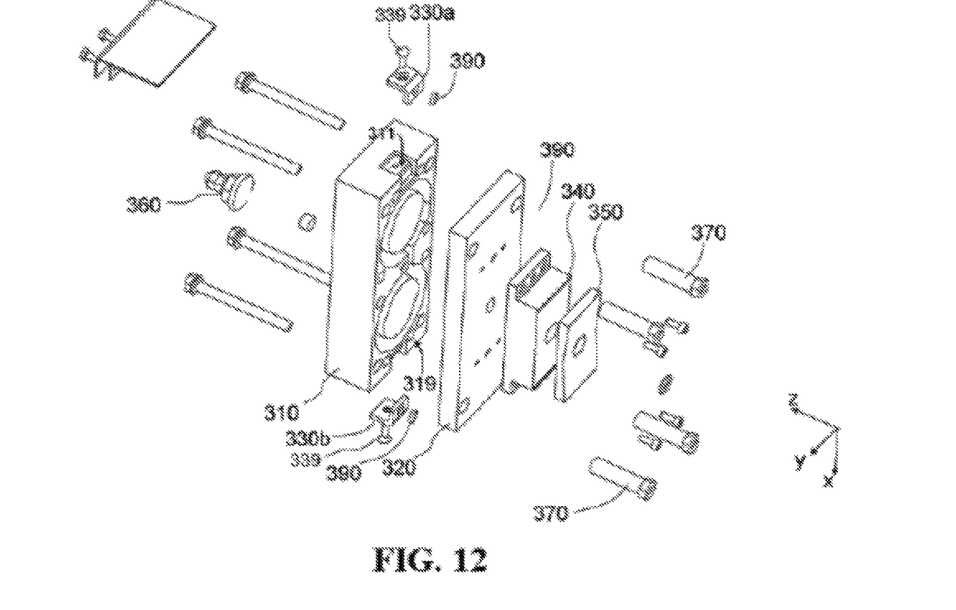
FIG. 12 is an exploded view of the elevator brake according to the third embodiment of the present invention.
Figure 13:
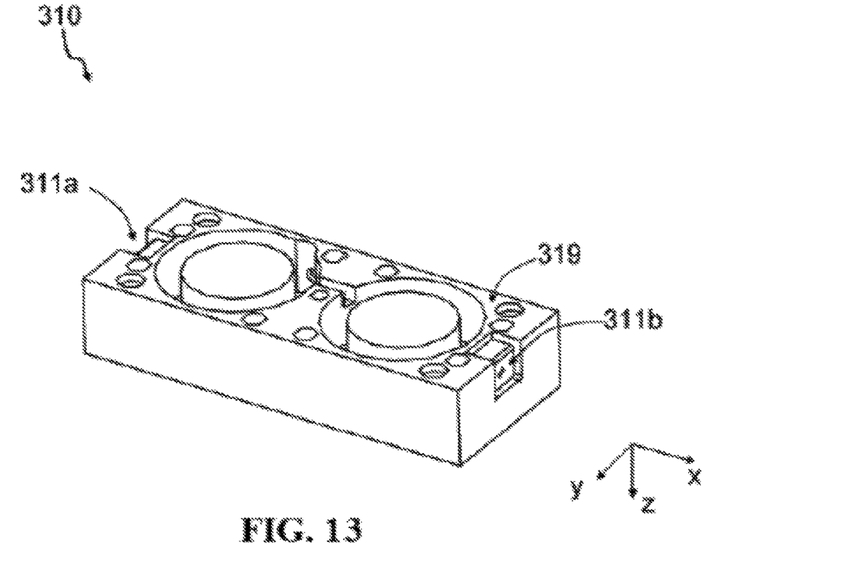
FIG. 13 is a three-dimensional schematic structural diagram of a static plate of the elevator brake according to the third embodiment of the present invention.
Figure 14:
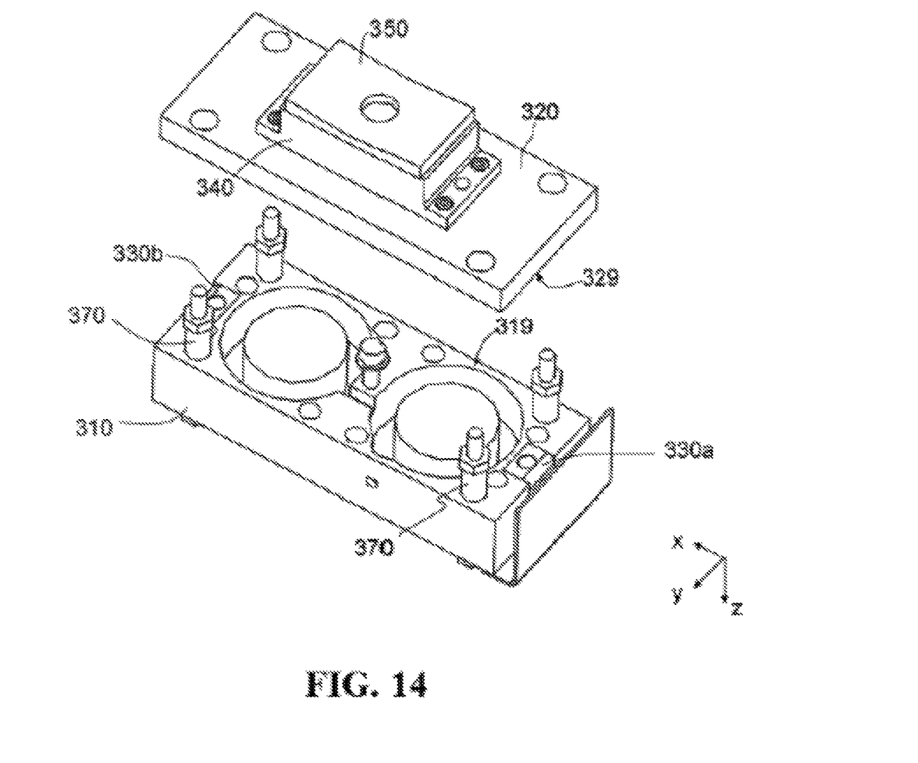
FIG. 14 is a three-dimensional schematic structural diagram of a static plate and a movable plate of the elevator brake according to the third embodiment of the present invention.
Figure 15A:
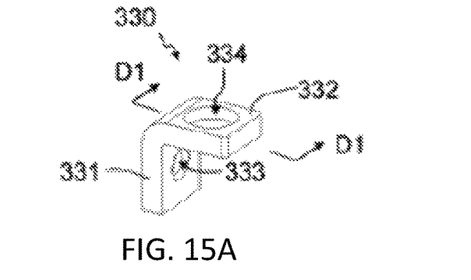
Figure 15B:
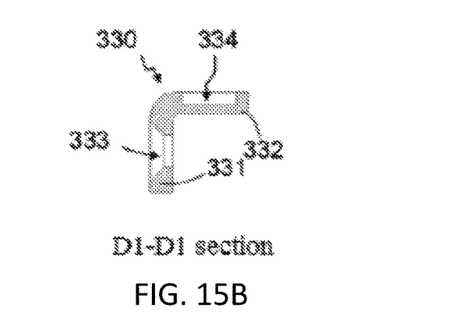
FIG. 15B is a schematic structural diagram of a D1-D1 section of the cushion support 330.
Figure 16A:
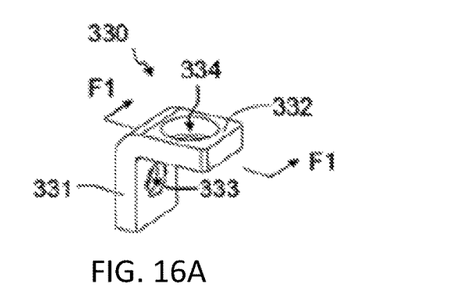
Figure 16B:
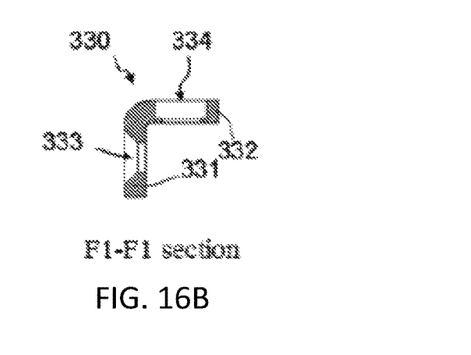
FIG. 16B is a schematic structural diagram of an F1-F1 section of the cushion support 330.

As shown in FIG. 12 to FIG. 14, interaction surfaces between the static plate 310 and the movable plate 320 are a collision surface 319 of the static plate 310 and a collision surface 329 of the movable plate 320 respectively; the collision surface 319 is a surface, which faces the movable plate 320, of the static plate 310, and the collision surface 329 is a surface, which faces the static plate 310, of the movable plate 320. In order to avoid adverse effects such as noise between the static plate 310 and the movable plate 320 during collision, a cushion 390 as shown in FIG. 12 needs to be disposed between the static plate 310 and the movable plate 320; the cushion 390 may be made of various materials having an elastic cushioning function, a specific material type selected for the cushion 390 is not limited, and the shape of the cushion 390 is not limited to the O ring in the embodiment shown in the figure, and may also be, for example, a cylinder.

A cushion support 330 (i.e., 330*a* and 330*b*) is specifically disposed for the cushion 390 of the elevator brake 30 in this embodiment of the present invention. The cushion support 330 may be used for disposing the cushion 390, and is specifically provided with a receiving hole 334. The shape of the receiving hole 334 may be designed corresponding to the shape of the cushion 390, for example, the diameter of the receiving hole 334 is set corresponding to the diameter of the cushion 390 which is an O ring or a cylinder; to prevent the cushion 390 from falling during replacement, the diameter of the circular receiving hole 334 is set to be slightly smaller than the aperture of the cushion 390, for example, 1-2 mm smaller than the aperture of the cushion 390, so that the cushion 390 is firmly mountable on the cushion support 330 and would not fall.

In this embodiment, the cushion support 330 of the elevator brake 30 is designed as a separate part, that is, the cushion support 330 is detachably mounted on the static plate 310; specifically, as shown in FIGS. 15A-15B and FIGS. 16A-16B, the cushion support 330 is provided with a threaded hole 333, and can be fixedly mounted on the static plate 310 by using a screw 339 as shown in FIG. 12, and the screw 339 may be detached, thus detaching the cushion support 330.

In this embodiment, there are two cushion supports 330, that is, the cushion supports 330*a* and 330*b*, which are oppositely disposed on the collision surface 319 of the static plate 310 along the y-direction; considering that two brake springs need to be disposed between the static plate 310 and the movable plate 320, optionally, the cushion support 330 may be disposed, between the two brake springs, on the collision surface 319 of the static plate 310, for example, a middle position along the x-direction on the static plate 310. The cushion support 330 in this embodiment includes a cushion receiving portion 332 and a fixed mounting portion 331, the cushion receiving portion 332 is provided with one, two, or more receiving holes 334 as described in the foregoing embodiment, and the fixed mounting portion 331 is provided with a threaded hole 133 as described in the foregoing embodiment; moreover, the fixed mounting portion 331 is perpendicularly bent with respect to the cushion receiving portion 332. The receiving hole 334 may be set to be a recessed hole structure as shown in the cushion support 330, and does not penetrate through the fixed mounting portion 331; for example, in the alternative embodiment shown in FIGS. 16A-16B, the receiving hole 334 may be set to be a stepped hole structure as shown in the cushion support 330, and penetrates through the fixed mounting portion 331.

Correspondingly, groove structures as shown in FIG. 13, such as a groove 311*b* and a groove 311*a*, are disposed on an edge position of the static plate 310; in this embodiment, the static plate 310 is of a cuboid structure, and the groove 311*b* and the groove 311*a* are disposed at a central position of a width direction (y-direction) of the cuboid-structure static plate. The groove 311*a* is used for receiving and fixing the cushion support 330*a*, and the groove 311*b* is used for receiving and fixing the cushion support 330*b*; the shape of the groove 311*a* is designed corresponding to the cushion support 330*a*, and the shape of the groove 311*b* is designed corresponding to the cushion support 330*b*. In this embodiment, the groove 311*b* and the groove 311*a* each include a first part of groove disposed on the collision surface 319 of the static plate 310 and a second part of groove disposed on an exposed surface of the static plate 310, where the first part of groove correspondingly receives the cushion receiving portion 332 of the cushion support 330, and the second part correspondingly receives the fixed mounting portion 331 of the cushion support 330. In this way, the cushion 390 disposed on the cushion receiving portion 332 acts on the collision surface 329 of the movable plate 320, and moreover, the fixed mounting portion 331 is disposed in an exposed manner on the exposed surface of the static plate 310, making it very convenient to detach or mount the cushion support 330; it is unnecessary to detach the whole including the static plate 310 and the movable plate 320, and therefore, the reliability of the elevator brake 30 would not be affected, and the operation is simple and time-saving. FIG. 14 is a schematic diagram in which the cushion support 330a and the cushion support 330b are fixedly mounted on the static plate 310, and as can be seen, the fixed mounting portions 331 thereof are oppositely exposed.

Further, as shown in FIG. 11 to FIGS. 16A-16B, the elevator brake 30 is further provided with a guiding component 370, which is fixed on the static plate 310 in the z-direction, and during the braking operation, a movement direction of the movable plate 320 with respect to the static plate 310 may be limited by using the guiding component 370, for example, the movement direction is limited to be the z-direction. The guiding component 370 may specifically be, but is not limited to, a guide sleeve.

Further, as shown in FIG. 11 to FIGS. 16A-16B, the elevator brake 30 is further provided with a brake lining 350; the brake lining 350 is disposed on a same side as the movable plate 320, and may synchronously move with the movable plate 320. During braking, the brake lining 350 may directly act on the brake pulley of the traction motor. Further, an intermediate block 340 is further disposed between the brake lining 350 and the movable plate 320, the brake lining 350 is fixed on the intermediate block 340, and the intermediate block 340 may be fixed on the movable plate 320 and synchronously move with the movable plate 320. The intermediate block 340 may be, for example, an aluminum block.

Further, as shown in FIG. 11 to FIGS. 16A-16B, the elevator brake 30 is further provided with a release component 360, and by using the release component 360, the elevator brake 30 may be released manually.

Figure 11:
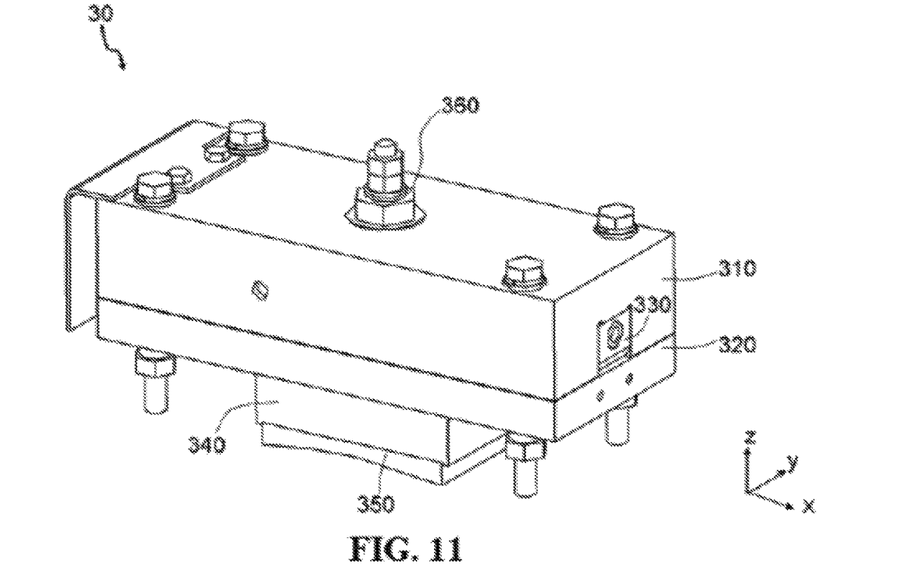
FIG. 11 is a three-dimensional schematic structural diagram of an elevator brake according to a third embodiment of the present invention.

When the cushion 390 of the elevator brake 30 in the embodiment shown in FIG. 11 needs replacement and maintenance, compared with the first embodiment shown in FIG. 1, fixing components, as shown in FIG. 11, on the periphery of the static plate 310 need to be removed first, to facilitate detaching and mounting of the cushion support; moreover, the coil of the static plate 310 is not electrified, and the movable plate 320 and the static plate 310 are in a normally open state (that is, a non-engaged state); the cushion support 330 is detached from the static plate 310 by loosening the screw 339, and the new cushion 390, as a replacement, is mounted to the cushion support 330; then, the cushion support 330 is placed in the groove 311 of the static plate 310, the screw 339 is fastened, and other peripheral components are restored and mounted. The whole process is simple and time-saving, and has a low specialized operation requirement on the staff; especially, it is unnecessary to disassemble the whole elevator brake 30, and the cushion replacement operation would not affect the running reliability of the elevator brake 30.

Herein, the "whole disassembly" of the elevator brake refers to detaching either the first block or the second block with respect to the other.

The above examples mainly describe the elevator brake of the present invention and the cushion replacement method thereof. Although only some implementations of the present invention are described, persons of ordinary skill in the art should understand that the present invention may be implemented in many other manners without departing from the purport and scope of the present invention. For example, the number of cushion supports is not limited to 2, and may further be 4; for another example, the collision surface of the movable plate in the second embodiment is provided with a groove to receive the cushion receiving portion of the cushion support. Therefore, the illustrated examples and implementations are regarded as illustrative rather than limitative, and the present invention may cover various modifications and replacements without departing from the spirit and scope of the present invention as defined in the appended claims.

What is claimed is:

1. An elevator brake, comprising an electromagnetic coil, a first block and a second block that collide with each other when the electromagnetic coil is electrified, and a cushion located between the first block and the second block, and further comprising a cushion support detachably mounted on the first block, the cushion being disposed on the cushion support;
   wherein the cushion support comprises a cushion receiving portion and a fixed mounting portion, the fixed mounting portion is perpendicularly bent with respect to the cushion receiving portion, the cushion receiving portion is disposed between the first block and the second block, and the fixed mounting portion is disposed in an exposed manner on an exposed surface of the first block;
   wherein the cushion support is detachably mounted on the first block and the first block is a static plate, and wherein the static plate is provided with a groove, and the groove is used for receiving and fixing the cushion support;
   wherein the groove comprises a first part of the groove disposed on a collision surface of the static plate and a second part of the groove disposed on an exposed surface of the static plate;
   wherein the collision surface of the static plate faces the second block, and the exposed surface is perpendicular to the collision surface, the first part of the groove is used for receiving the cushion receiving portion of the cushion support, and the second part of the groove is used for receiving and fixing the fixed mounting portion of the cushion support.

2. The elevator brake according to claim 1, wherein the cushion receiving portion is provided with one or more receiving holes for mounting the cushion.

3. The elevator brake according to claim 2, wherein the cushion is an O ring or a cylinder, and an aperture of the receiving hole is set to be smaller than a diameter of the cushion such that the cushion is firmly mountable on the cushion support.

4. The elevator brake according to claim 2, wherein the receiving hole is of a stepped hole structure penetrating through the fixed mounting portion, or a recessed hole structure not penetrating through the fixed mounting portion.

5. The elevator brake according to claim 1, wherein the fixed mounting portion is provided with a threaded hole, and a screw penetrates through the threaded hole to detachably fasten the cushion support on the first block or the second block.

6. The elevator brake according to claim 1, wherein the static plate is of a cuboid structure, and the groove is disposed at a central position in a length direction of the cuboid-structure static plate.

7. The elevator brake according to claim 1, wherein the static plate is of a cuboid structure, and the groove is disposed at a central position in a width direction of the cuboid-structure static plate.

8. The elevator brake according to claim 1, wherein the second block is a movable plate, the elevator brake is further provided with a guiding component, and the guiding component is used for limiting a movement direction of the movable plate with respect to the static plate.

9. The elevator brake according to claim 8, wherein the elevator brake is provided with a brake lining and an intermediate block, the brake lining and the intermediate block are disposed on a same side as the movable plate and synchronously move with the movable plate.

10. The elevator brake according to claim 1, wherein the elevator brake is further provided with a release component.

11. The elevator brake according to claim 1, wherein two or more cushion supports are provided.

12. A cushion replacement method of the elevator brake according to claim 1, comprising:
   detaching the cushion support from the elevator brake without detaching at least the first block or second block of the elevator brake;
   replacing the cushion mounted on the cushion support; and
   mounting and fixing the cushion support back to the elevator brake.

13. The cushion replacement method according to claim 12, wherein the detaching the cushion support is performed in the case that the elevator brake is not powered on, and in this case, the first block and the second block are disengaged.

14. An elevator system, using the elevator brake according to claim 1.

* * * * *